US 10,503,257 B2

United States Patent
Masihy et al.

(10) Patent No.: US 10,503,257 B2
(45) Date of Patent: Dec. 10, 2019

(54) PORTABLE ELECTRONIC DEVICE AND METHOD OF PROVIDING HAPTIC FEEDBACK

(71) Applicant: BlackBerry Limited, Waterloo (CA)

(72) Inventors: Jorge Hector Masihy, Coral Springs, FL (US); Jose Eduardo Korneluk, Lake Worth, FL (US); Amirsaman Mirzaei, Sunrise, FL (US)

(73) Assignee: BlackBerry Limited, Waterloo (CA)

( * ) Notice: Subject to any disclaimer, the term of this patent is extended or adjusted under 35 U.S.C. 154(b) by 80 days.

(21) Appl. No.: 15/051,501

(22) Filed: Feb. 23, 2016

(65) Prior Publication Data
US 2017/0242484 A1 Aug. 24, 2017

(51) Int. Cl.
*G06F 3/01* (2006.01)
*G06F 3/02* (2006.01)
(Continued)

(52) U.S. Cl.
CPC ............ *G06F 3/016* (2013.01); *G06F 1/1624* (2013.01); *G06F 1/1662* (2013.01); *G06F 3/02* (2013.01);
(Continued)

(58) Field of Classification Search
CPC ...... G06F 3/016; G06F 1/1624; G06F 1/1622; G06F 1/1644; G06F 1/1666; G06F 1/1677
See application file for complete search history.

(56) References Cited

U.S. PATENT DOCUMENTS

2003/0025679 A1* 2/2003 Taylor .................. G06F 3/0414
345/175
2003/0064688 A1* 4/2003 Mizuta ................ H04M 1/0237
455/90.2
(Continued)

FOREIGN PATENT DOCUMENTS

| EP | 2538303 A1 | 12/2012 |
| EP | 2570892 A1 | 3/2013 |
| EP | 2816460 A1 | 12/2014 |

OTHER PUBLICATIONS

Printout of "Automatically Hide On-Screen Keyboard on Android When Using External Keyboard", retrieved on Jan. 5, 2016 from http://www.guidingtech.com/19202/hide-on-screen-keyboard-android-external/.
(Continued)

*Primary Examiner* — Dong Hui Liang
(74) *Attorney, Agent, or Firm* — Borden Ladner Gervais LLP; Geoffrey deKleine

(57) ABSTRACT

A method for providing haptic feedback at a portable electronic device including a touch-sensitive display and a physical keyboard comprising depressible keys and touch sensors for detecting touches thereon, is provided. In response to detecting a first touch on the physical keyboard, which physical keyboard is moveable relative to the touch-sensitive display, between a first position in which the physical keyboard is exposed for use and a second position in which the physical keyboard is not exposed, wherein the first touch is associated with haptic feedback, first haptic feedback is provided to the physical keyboard. In response to detecting a second touch on the touch-sensitive display when the physical keyboard is in the second position in which the physical keyboard is not exposed, wherein the second touch is associated with haptic feedback, second haptic feedback is provided to the touch-sensitive display.

12 Claims, 4 Drawing Sheets

(51) Int. Cl.
*G06F 3/041* (2006.01)
*G06F 1/16* (2006.01)
*H04M 1/02* (2006.01)
*G06F 3/0488* (2013.01)

(52) U.S. Cl.
CPC .......... *G06F 3/0202* (2013.01); *G06F 3/0412* (2013.01); *G06F 3/04886* (2013.01); *H04M 1/0237* (2013.01); *H04M 1/0247* (2013.01)

(56) References Cited

U.S. PATENT DOCUMENTS

| | | | |
|---|---|---|---|
| 2008/0084384 A1 | 4/2008 | Gregorio et al. | |
| 2009/0091537 A1* | 4/2009 | Huang | G06F 1/1616 345/169 |
| 2009/0167694 A1* | 7/2009 | Tan | G06F 1/1613 345/168 |
| 2010/0169818 A1* | 7/2010 | Hughes | G06F 3/0481 715/773 |
| 2011/0195752 A1 | 8/2011 | Siddiqui et al. | |
| 2011/0205161 A1* | 8/2011 | Myers | G06F 3/016 345/169 |
| 2011/0234498 A1 | 9/2011 | Gray et al. | |
| 2012/0127071 A1* | 5/2012 | Jitkoff | G06F 3/0481 345/156 |
| 2012/0262887 A1 | 10/2012 | Park et al. | |
| 2014/0218303 A1* | 8/2014 | Kao | G06F 3/016 345/168 |
| 2014/0375568 A1* | 12/2014 | Berglund | G06F 3/0227 345/169 |
| 2015/0378436 A1* | 12/2015 | Uchikawa | G06F 3/0416 345/173 |

OTHER PUBLICATIONS

Printout of "Symbian Keyboard", retrieved on Jan. 5, 2016 from https://www.waze.com/forum/viewtopic.php?f=3&t=5755.
European Patent Application No. 17153150.2, European Search Report dated Jul. 10, 2017.
European Patent Application No. 17153150.2, European Search Report dated Feb. 2, 2018.

* cited by examiner

PORTABLE ELECTRONIC DEVICE AND METHOD OF PROVIDING HAPTIC FEEDBACK

FIELD OF TECHNOLOGY

The present disclosure relates to portable electronic devices including physical keyboards and touch-sensitive displays and to the provision of haptic feedback at such portable electronic devices.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones (smart phones), Personal Digital Assistants (PDAs), and tablet computers with wireless network communications or near-field communications connectivity such as Bluetooth® capabilities.

Portable electronic devices such as PDAs, or tablet computers are generally intended for handheld use and ease of portability. Touch-sensitive input devices are particularly useful on portable electronic devices, which are small and may have limited space for user input and output.

Improvements in electronic devices with touch-sensitive input devices are desirable.

BRIEF DESCRIPTION OF THE DRAWINGS

Embodiments of the present disclosure will now be described, by way of example only, with reference to the attached figures, in which.

DETAILED DESCRIPTION

Figure 1:
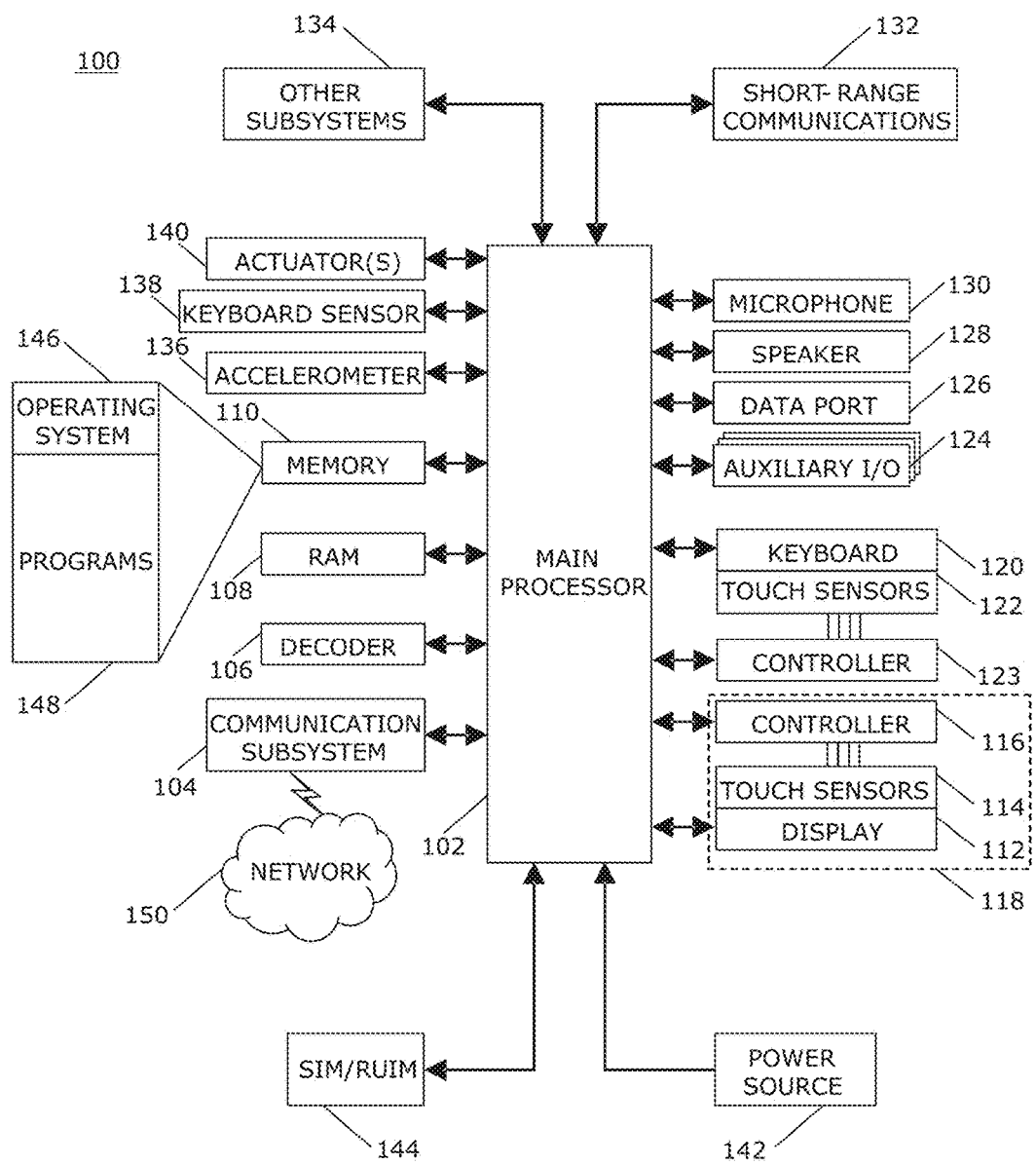
FIG. 1 is a block diagram of an example of a portable electronic device in accordance with the disclosure.

The following describes a portable electronic device including a touch-sensitive display and a physical keyboard comprising depressible keys and including touch sensors for detecting touches thereon, and a method of providing haptic feedback on the portable electronic device. In response to detecting a first touch on the physical keyboard, which physical keyboard is moveable relative to the touch-sensitive display, between a first position in which the physical keyboard exposed for use and a second position in which the physical keyboard is not exposed, wherein the first touch is associated with haptic feedback, first haptic feedback is provided to the physical keyboard. In response to detecting a second touch on the touch-sensitive display when the physical keyboard is in the second position in which the physical keyboard is not exposed, wherein the second touch is associated with haptic feedback, second haptic feedback is provided to the touch-sensitive display.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device. Examples of portable electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth.

A block diagram of an example of an electronic device 100 is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, a physical keyboard 120, an auxiliary input/output (I/O) subsystem 124, a data port 126, a speaker 128, a microphone 130, short-range communications 132 and other device subsystems 134. The touch-sensitive display 118 includes a display 112 and touch sensors 114 that are coupled to at least one controller 116 that is utilized to interact with the processor 102. Input via a graphical user interface is provided via the touch-sensitive display 118. Thus, the touch sensors 114 and the controller 116 are utilized as an input device. Information, such as text, characters, symbols, images, icons, and other items that may be displayed or rendered on a portable electronic device, is displayed on the touch-sensitive display 118 via the processor 102. The physical keyboard 120 includes a plurality of mechanical keys that include mechanical switches or contacts for input to the electronic device 100 when a mechanical key of the keyboard is depressed by a sufficient amount to oppose a bias of the mechanical key. In this example, touch sensors 122 are disposed on the physical keyboard 120 and the touch sensors 122 are coupled to a controller 123. Thus, in addition to depression of the mechanical keys of the physical keyboard 120 for input to the portable electronic device 100, touches on the mechanical keys are also detected for input to the processor 102.

The processor 102 may also interact with an accelerometer 136 that may be utilized to detect direction of gravitational forces or gravity-induced reaction forces, a keyboard sensor 138 that is utilized to detect a position of the physical keyboard 120 which is moveable relative to the touch-sensitive display 118, and one or more actuator(s) 140 that are utilized to selectively provide haptic feedback in response to a touch on the physical keyboard 120 and to selectively provide haptic feedback in response to a touch on the touch-sensitive display 118.

To identify a subscriber for network access, the electronic device 100 may utilize a Subscriber Identity Module or a Removable User Identity Module (SIM/RUIM) card 144 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display. A capacitive touch-sensitive display includes capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected. A tap, which is a particular type of touch may be a touch that ends within a threshold period of time. Thus, the touch contact with the touch-sensitive display 118 is relatively short because contact ends within a threshold period of time of beginning.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The touch sensors 122 on the physical keyboard 120 may be any suitable touch sensors, such as capacitive touch-sensors and may comprise any suitable material, such as indium tin oxide (ITO). Optionally, the touch sensors 122 disposed on the physical keyboard 120 may be coupled to the same controller 116 as the touch sensors of touch-sensitive display 118 such that a single controller is utilized rather than two controllers 116, 123.

One or more touches on the keys of the keyboard 120 may be detected. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the keyboard 120. A touch may be detected from any suitable input member and multiple simultaneous touches may be detected.

One or more gestures may also be detected by the touch sensors 122 disposed on the keyboard 120. A gesture on the keys of the keyboard 120 may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover.

The touch-sensitive display 118 includes a display area in which information may be displayed, and a non-display area extending around the periphery of the display area. Information is not displayed in the non-display area by the display, which non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image is displayed by the display 112 in the non-display area. Touch sensors may be disposed in the non-display area, which touch sensors may be extended from the touch sensors in the display area or distinct or separate touch sensors from the touch sensors in the display area. A touch on the touch-sensitive display 118, including a gesture, may be associated with the display area, the non-display area, or both areas. The touch sensors may extend across substantially the entire non-display area or may be disposed in only part of the non-display area.

Figure 2:
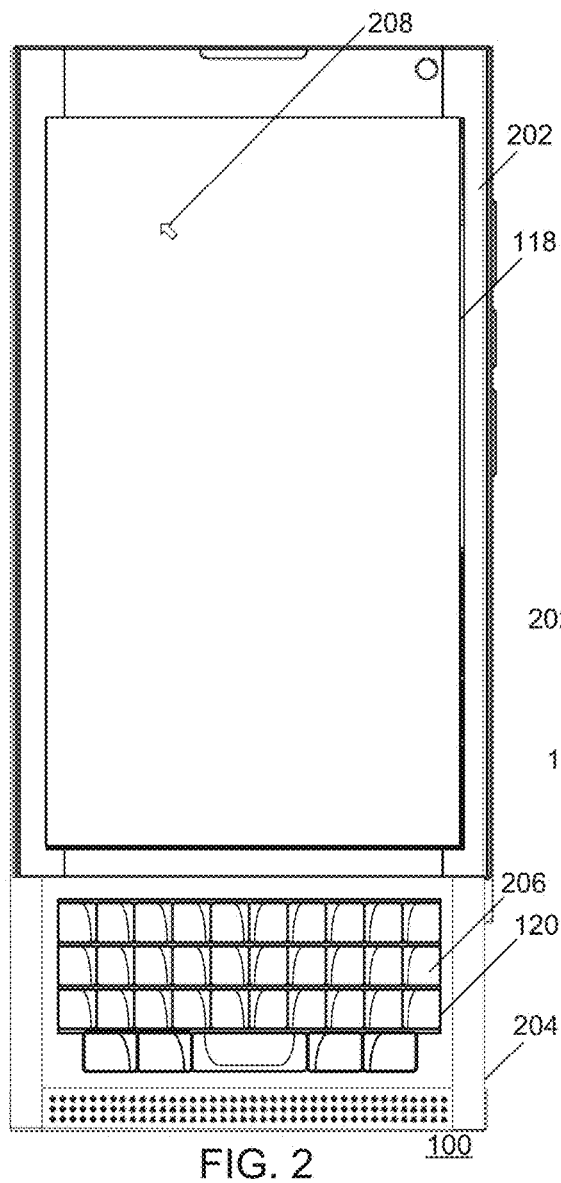
FIG. 2 is a front view of an example of a portable electronic device including a touch-sensitive display and a physical keyboard that is movable relative to the touch-sensitive display, with the keyboard in a first position, in accordance with the present disclosure.

A front view of an example of the electronic device 100 is shown in FIG. 2. The electronic device 100 includes a display housing 202 in which the touch-sensitive display 118 is disposed. The display housing 202 is utilized to enclose components including at least some of the components shown in FIG. 1.

The physical keyboard 120 is disposed in a keyboard housing 204, which is shown in FIG. 2, below the touch-sensitive display 118 in the orientation illustrated in FIG. 2. The physical keyboard 120 includes a plurality of mechanical keys 206. Each one of the mechanical keys 206 of the keyboard is associated characters or a function such that the characters are entered utilizing the mechanical keys 206. The keyboard housing 204 may also be utilized to enclose components including at least some of the components shown in FIG. 1.

The one or more actuators 140 may be disposed in the keyboard housing 204 or both the keyboard housing 204 and the display housing 202. As indicated above, the one or more actuators 140 are utilized to selectively provide haptic feedback in response to a touch on the physical keyboard 120 and to selectively provide haptic feedback in response to a touch on the touch-sensitive display 118. The actuators 140 may be, for example, vibrating actuator, such as one or more vibratory motors for providing vibratory haptic feedback, piezoelectric elements for providing vibratory or other feedback, or any other suitable actuator for providing haptic feedback.

According to one example, a first one of the actuators 140 is provided in the keyboard housing 204 for selectively providing haptic feedback in response to a touch on the physical keyboard 120 and a second one of the actuators 140 is provided in the display housing 202 for selectively providing haptic feedback in response to a touch on the touch-sensitive display 118.

Alternatively, a single actuator 140 may be provided in the keyboard housing 204 for selectively providing haptic feedback in response to a touch on physical keyboard 120 and for selectively providing haptic feedback in response to a touch on the touch-sensitive display 118. The intensity of the actuation, for example, the intensity of the vibration, may be controlled to actuate the actuator 140 with greater intensity in response a touch on the touch-sensitive display 118 compared with the intensity of actuation in response to a touch on the physical keyboard 120. By actuating the actuator at two different intensities when the actuator 140 is disposed in the keyboard housing 204, the haptic feedback sensed by the user may be generally equivalent for both a touch on the touch-sensitive display 118 and a touch on the mechanical keyboard 120.

Figure 3:
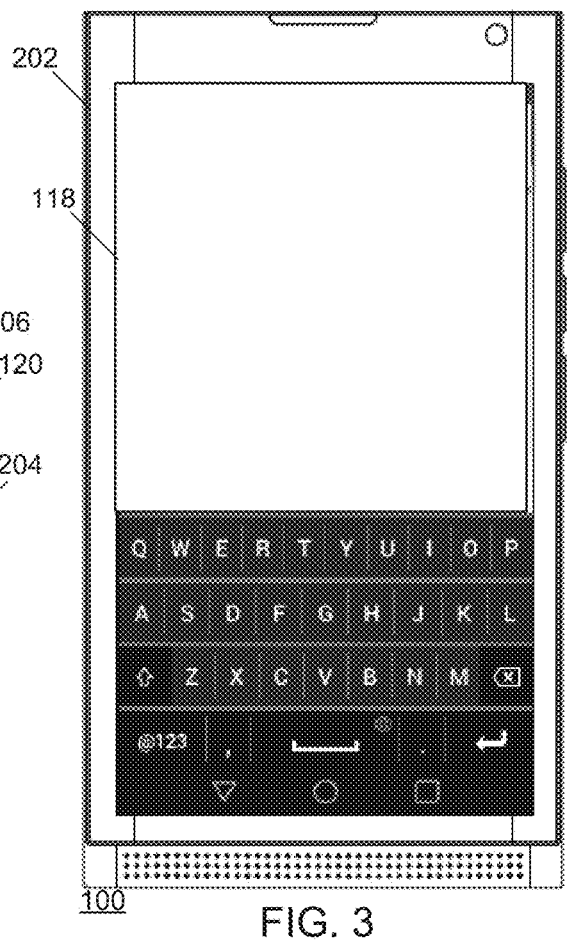
FIG. 3 is a front view of an example of a portable electronic device including a touch-sensitive display and a physical keyboard that is movable relative to the touch-sensitive display, with the keyboard in a second position, in accordance with the present disclosure.

The keyboard housing 204 is moveable relative to the display housing 202 by sliding the keyboard housing 204 relative to the display housing 202 between a first position in which the keyboard housing 204 extends from the display housing 202 to expose the physical keyboard 120 below the touch-sensitive display 118 in the orientation in which the portable electronic device 100 is illustrated in FIG. 2, and a second position in which the keyboard housing 204 is stacked with the display housing 202 such that the physical keyboard 120 is disposed between the display housing 202 and a back of the keyboard housing 204, as shown in FIG. 3. Thus, the physical keyboard 120 is moveable relative to the touch-sensitive display 118, between a first position, shown in FIG. 2, in which the physical keyboard is exposed for use and a second position, shown in FIG. 3, in which the physical keyboard 120 is not exposed and therefore is not used. The physical keyboard 120 is therefore selectively exposable for use. The keyboard sensor 138, referred to above with reference to FIG. 1, is arranged and constructed to detect a position of the keyboard housing 204 relative to the display housing 202. Thus, the keyboard sensor 138 may be utilized to detect the position of the physical keyboard 120. The keyboard sensor 138 is coupled to the processor 102 to identify the position of the physical keyboard 120 relative to the touch-sensitive display 118.

In the example shown in FIG. 2, the physical keyboard 120 is a QWERTY keyboard. Other keyboard layouts may be successfully implemented, such as an AZERTY keyboard, a QWERTZ keyboard, or any other suitable keyboard.

Information may be displayed on the touch-sensitive display 118. The information displayed may include any suitable information such as icons, text, pictures, video, documents, a webpage, or any other suitable information. The information may be associated with, for example, a home page, a menu or submenu, an application or applications, and so forth. The information may be selectable, for example, by a touch on the touch-sensitive display 118, or by a touch, such as a hover gesture, a tap, a double tap, or other suitable touch, on the physical keyboard 120. The physical keyboard 120 may be utilized to control movement of a cursor, such as the cursor 208, caret, or other displayed control element on the touch-sensitive display 118 and to select information displayed on the touch-sensitive display 118.

A virtual keyboard 302 may also be displayed, as illustrated in FIG. 3. The keys of the virtual keyboard 302 are selectable by a touch on an area of the touch-sensitive display 118 associated with the respective key. Display of the virtual keyboard 302 may be discontinued in response to movement of the keyboard housing 204 to the position shown in FIG. 2 to thereby expose the physical keyboard 120.

Figure 4:
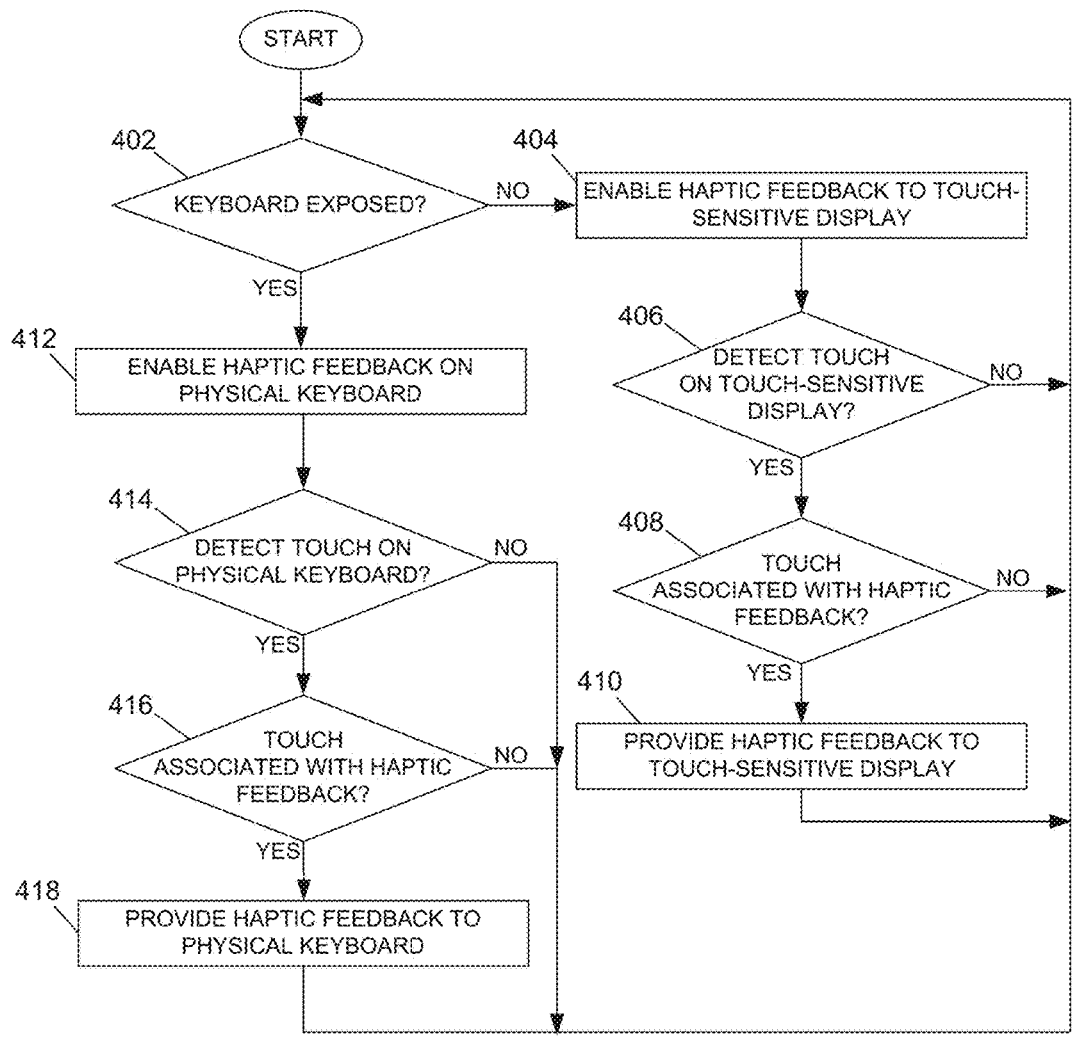
FIG. 4 is a flowchart illustrating an example of a method of providing haptic feedback at the portable electronic device of FIG. 1 in accordance with the disclosure.

A flowchart illustrating a method of providing haptic feedback is shown in FIG. 4. The method may be carried out by software executed, for example, by a processor 102 in a portable electronic device 100, such as the portable electronic device 100 according to the example described above in which a first actuator 140 is provided in the keyboard housing 204 for selectively providing haptic feedback in response to a touch on the physical keyboard 120 and a second actuator 140 is provided in the display housing 202 for selectively providing haptic feedback in response to a touch on the touch-sensitive display 118. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, such as a non-transitory computer-readable device.

The method illustrated in FIG. 4 may be carried out, for example, any time the portable electronic device 120 is not in a low power state in which the display 112 is off or a backlight of the display is off.

A determination is made whether the physical keyboard 120 is in the first position in which the physical keyboard 120 is exposed, or in the second position in which the physical keyboard 120 is not exposed, based on a signal or signals from the keyboard sensor 138 at 402. In response to determining that the keyboard is not exposed at 402, the process continues at 404 and haptic feedback is enabled on the touch-sensitive display 118. Thus, haptic feedback is selectively provided in response to touches on the touch-sensitive display 118. Haptic feedback is also disabled on the physical keyboard 120.

In response to detecting a touch on the touch-sensitive display 406, the processor 102 determines whether the touch is associated with haptic feedback at 408. The touch may be associated with haptic feedback, for example, when the location of the touch is associated with a selectable element displayed on the touch-sensitive display 118 and the touch selects the selectable element. In response to determining that the touch is associated with haptic feedback, the haptic feedback is provided to the touch-sensitive display 118 at 410. Optionally, the speaker 128 may also be utilized to provide audible feedback. As shown in FIG. 4, in response to determining that the touch is not associated with haptic feedback, the process continues at 402 and a determination is again made whether the physical keyboard 120 is in the first position in which the physical keyboard 120 is exposed or in the second position in which the physical keyboard 120 is not exposed, based on a signal or signals from the keyboard sensor 138 at 402. Thus, a touch that is not at a location associated with a selectable element or does not select a selectable element is not associated with haptic feedback.

In response to determining that the physical keyboard is exposed at 402, the process continues at 412 and haptic feedback is enabled on the physical keyboard 120. Thus, haptic feedback is selectively provided in response to touches on the physical keyboard 120. In the present embodiment, when haptic feedback is enabled on the physical keyboard 120, haptic feedback is disabled on the touch-sensitive display 118. Thus, haptic feedback is not provided in response to touches on the touch-sensitive display 118.

In response to detecting a touch on the physical keyboard 120 at 414, the processor 102 determines whether the touch is associated with haptic feedback at 416. As indicated above, the physical keyboard 120 may be utilized to control movement of a cursor, caret, or other displayed control element on the touch-sensitive display 118 and to select information displayed on the touch-sensitive display 118. The information may be selectable, for example, by a touch, such as a hover gesture, a tap, a double tap, or other suitable touch, on the physical keyboard 120.

The touch detected at 414 may be associated with haptic feedback, for example, when the cursor is associated with a selectable element displayed on the touch-sensitive display 118 and the touch on the physical keyboard 120 selects the selectable element. In response to determining that the touch is associated with haptic feedback at 418, the haptic feedback is provided to the physical keyboard at 418. Optionally, the speaker 128 may also be utilized to provide audible feedback. As shown in FIG. 4, in response to determining that the touch is not associated with haptic feedback, the process continues at 302 and a determination is again made whether the physical keyboard 120 is in the first position in which the physical keyboard 120 is exposed or in the second position in which the physical keyboard 120 is not exposed, based on a signal or signals from the keyboard sensor 138 at 302. Thus, a touch on the physical keyboard 120 that does not select a selectable element, for example, is not associated with haptic feedback.

A first actuator 140 disposed in the display housing 202 may be actuated to provide the haptic feedback at 410 and a second actuator 140 disposed in the keyboard housing 204 may be actuated to provide the haptic feedback at 418. Alternatively, a single actuator 140 may disposed in the keyboard housing 204 and is utilized to provide the haptic feedback at 410 and at 418. As described above, the intensity of the actuation, for example, the intensity of the vibration, may be controlled to actuate the actuator 140 with greater intensity to provide haptic feedback at 410 compared to the intensity of actuation at 418. By actuating the actuator at two different intensities when the actuator 140 is disposed in the keyboard housing 204, the haptic feedback sensed by the user at 410 may be generally equal to the haptic feedback sensed by the user at 418.

Thus, as illustrated in FIG. 4, haptic feedback is transferred to the touch-sensitive display 118 when the physical keyboard 120 is not exposed and is transferred to the physical keyboard 120 when the physical keyboard 120 is exposed.

Figure 5:
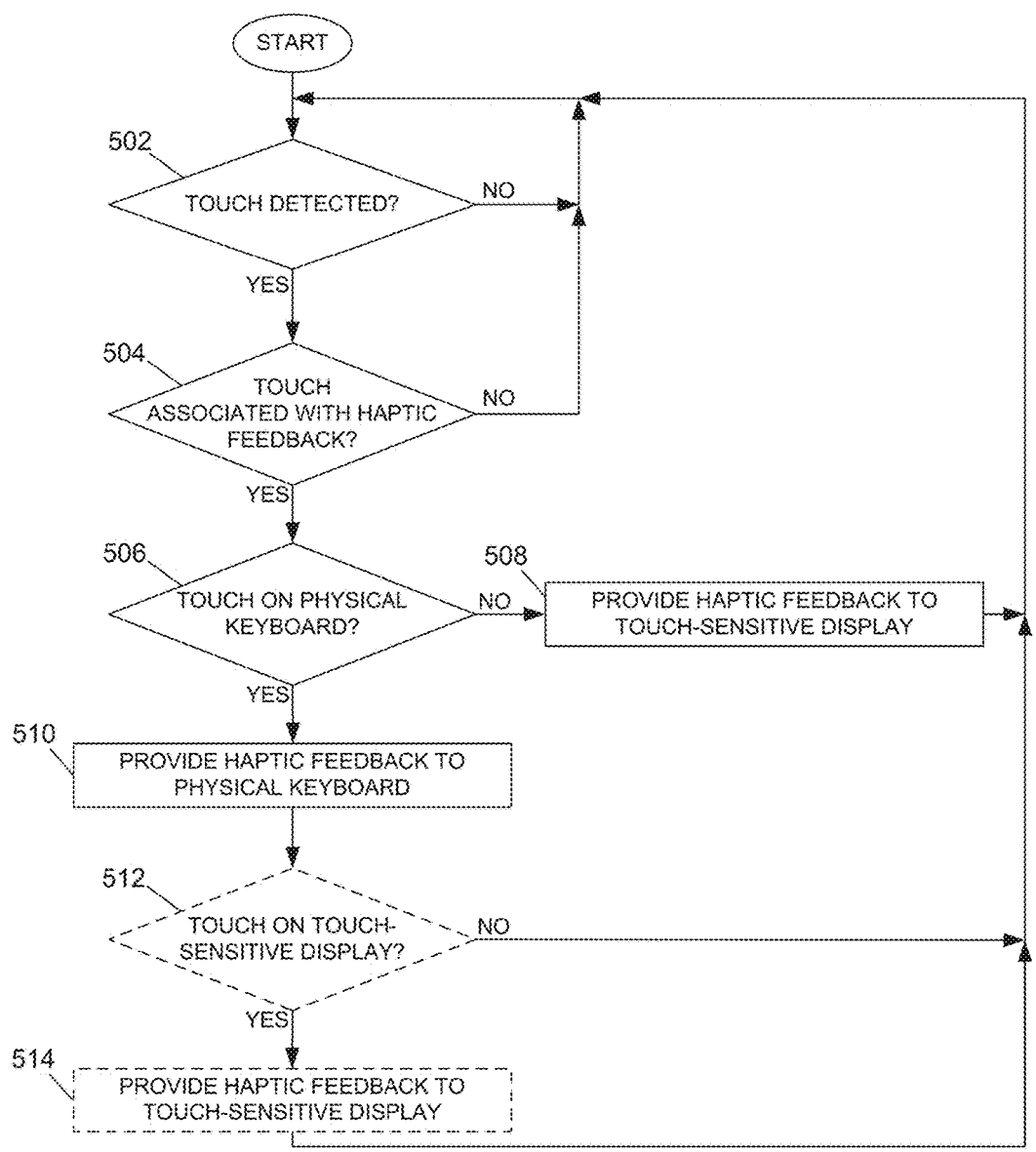
FIG. 5 is a flowchart illustrating another example of a method of providing haptic feedback at the portable electronic device of FIG. 1 in accordance with the present disclosure.

A flowchart illustrating another method of providing haptic feedback is shown in FIG. 5. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, such as a non-transitory computer-readable device.

As with the method illustrated in FIG. 4, the method illustrated in FIG. 5 may be carried out, for example, any time the portable electronic device 120 is not in a low power state in which the display 112 is off or a backlight of the display is off.

In response to detecting a touch on the touch-sensitive display 118 or on the physical keyboard 120 at 502, the process continues at 504 and the processor 102 determines whether the touch is associated with haptic feedback at 504. The touch may be associated with haptic feedback, for example, when the location of a touch on the touch-sensitive display 118 is associated with a selectable element displayed on the touch-sensitive display 118 and the touch selects the selectable element. The touch detected at 502 may also be associated with haptic feedback, for example, when a cursor is associated with a selectable element displayed on the touch-sensitive display 118 and a touch on the physical keyboard 120 selects the selectable element.

As shown in FIG. 5, in response to determining that the touch is not associated with haptic feedback, the process continues at 502. Thus, a touch that does not select a selectable element displayed on the touch-sensitive display 118 is not associated with haptic feedback.

In response to determining that the touch is associated with haptic feedback at 504, the process continues at 506. If the touch, detected at 502, is not a touch on the physical keyboard 120 the process continues at 508 and haptic feedback is provided to the touch-sensitive display 118 at 508. Optionally, the speaker 128 may also be utilized to provide audible feedback. If the touch is a touch on the physical keyboard 120, haptic feedback is provided to the physical keyboard 120 at 510. Optionally, the speaker 128 may also be utilized to provide audible feedback.

Optionally, in response to determining that the touch is also on the touch-sensitive display 118 at 512, haptic feedback may also be provided to the touch-sensitive display 118 at 514, in addition to providing haptic feedback to the physical keyboard 120. Thus, when touches are detected on both the physical keyboard 120 and on the touch-sensitive display 118, haptic feedback may be provided to both the physical keyboard 120 and the touch-sensitive display 118. For example, a multi-touch, or touch on the physical keyboard 120 that overlaps at least partially in time with a touch on the touch-sensitive display 118, i.e., the time during which the touch on the physical keyboard 120 is maintained overlaps with the time during which the touch on the touch-sensitive display 118 is maintained, may result in haptic feedback at both the physical keyboard 120 and the touch-sensitive display 118.

In the examples of FIG. 4 and FIG. 5, haptic feedback is provided to the physical keyboard 120 in response to detecting a touch, on the physical keyboard 120, that is associated with haptic feedback. Haptic feedback is also provided to the touch-sensitive display 118 in response to detecting a touch, on the touch-sensitive display 118, that is associated with haptic feedback.

Advantageously, haptic feedback may be provided to the physical keyboard 120 when a touch is detected on the physical keyboard 120, that does not cause depression of a button or key of the physical keyboard. Thus, haptic feedback may be provided in response to a touch on the keyboard with a force that is not sufficient to depress a mechanical key of the keyboard. The haptic feedback may be provided by one or more haptic actuators. The haptic feedback provides a positive feedback to the user of an input utilizing the physical keyboard 120 or, for example, a virtual keyboard displayed on the touch-sensitive display 118, depending on the position of the physical keyboard 120 relative to the touch-sensitive display. This positive feedback confirms that a selection is made utilizing the physical keyboard 120 or the touch-sensitive display 118, reducing the chance of time-consuming or frustrating additional input that may result from failure to recognize that the input is received.

The scope of the claims should not be limited by the preferred embodiments set forth in the examples, but should be given the broadest interpretation consistent with the description as a whole.

What is claimed is:

1. A method of providing haptic feedback at a portable electronic device including a display housing including a touch-sensitive display, and a keyboard housing moveably coupled to the display housing such that the keyboard is moveable relative to the touch-sensitive display, the keyboard housing including an actuator and a physical keyboard comprising mechanical keys depressible to enter characters associated with the mechanical keys, and touch sensors for detecting touches on the mechanical keys absent depression of the mechanical keys, the method comprising:

detecting a first touch on the physical keyboard wherein the first touch is detected when the physical keyboard is in a first position in which the physical keyboard is exposed for use;

in response to detecting the first touch on the physical keyboard, which physical keyboard is moveable relative to the touch-sensitive display, between the first position in which the physical keyboard is exposed for use and a second position in which the physical keyboard is not exposed, wherein a force of the first touch is insufficient to cause depression of any of the mechanical keys to enter any of the characters associated with the mechanical keys, and the first touch is associated with haptic feedback, providing first haptic feedback to the physical keyboard by actuating the actuator disposed in the keyboard housing, at a first intensity;

in response to detecting that the physical keyboard is in the first position in which the physical keyboard is exposed for use, disabling haptic feedback in response to touches on the touch-sensitive display, and detecting a second touch on the touch-sensitive display wherein the second touch is detected when the physical keyboard is exposed for use, and wherein haptic feedback is not provided in response to detecting the second touch on the touch-sensitive display;

detecting that the physical keyboard is in the second position in which the physical keyboard is not exposed;

in response to detecting that the physical keyboard is in the second position in which the physical keyboard is not exposed, enabling haptic feedback in response to touches on the touch-sensitive display;

detecting a third touch on the touch-sensitive display when the physical keyboard is in the second position in which the physical keyboard is not exposed;

in response to detecting d the third touch on the touch-sensitive display when the physical keyboard is in the second position in which the physical keyboard is not exposed, wherein the third touch is associated with haptic feedback, providing second haptic feedback to the touch-sensitive display by actuating the actuator disposed in the keyboard housing at a second intensity, wherein the second intensity is greater than the first intensity, such that haptic feedback is provided to the touch- sensitive display disposed in the display housing, which is different than the keyboard housing in which the actuator is disposed.

2. The method according to claim 1, wherein providing the first haptic feedback comprises actuating the actuator at the first intensity in response to detecting that the physical keyboard is in the first position in which the physical keyboard is exposed for use.

3. The method according to claim 2, wherein providing the second haptic feedback comprises actuating the actuator at the second intensity that is greater than the first intensity, in response to detecting that the physical keyboard is in the second position in which the physical keyboard is not exposed.

4. The method according to claim 1, wherein the first touch is associated with haptic feedback when the first touch comprises a selection input on the physical keyboard to select a selectable element displayed on the touch-sensitive display.

5. The method according to claim 1, wherein the third touch is associated with haptic feedback when the third touch comprises a selection input on the touch-sensitive display to select a selectable element displayed on the touch-sensitive display.

6. The method according to claim 1, wherein the second intensity is greater than the first intensity to provide generally equivalent haptic feedback to the user.

7. A non-transitory computer-readable storage medium having computer-readable code executable by at least one processor of the portable electronic device to perform the method according to claim 1.

8. A portable electronic device comprising:

a display housing including a touch-sensitive display for displaying information, including selectable elements, and for detecting touches thereon;

a keyboard housing moveably coupled to the display housing such that the keyboard is moveable relative to the touch-sensitive display, the keyboard housing including a physical keyboard comprising mechanical keys depressible to enter characters associated with the mechanical keys, and including touch sensors for detecting touches on the mechanical keys absent depression of the mechanical keys, the keyboard housing and the physical keyboard being moveable relative to the touch-sensitive display, between a first position in which the physical keyboard is exposed for use and a second position in which the physical keyboard is not exposed;

a haptic actuator disposed in the keyboard housing for providing haptic feedback to the touch sensitive display and on the physical keyboard;

a processor coupled to the physical keyboard, the touch-sensitive display, and the haptic actuator and configured to:

disable haptic feedback in response to touches on the touch-sensitive display in response to detecting that the physical keyboard is in the first position in which the physical keyboard is exposed for use, enable haptic feedback in response to touches on the touch-sensitive display in response to detecting that the physical keyboard is in the second position in which the physical keyboard is not exposed; provide first haptic feedback to the physical keyboard by actuating the actuator at a first intensity in response to:

detecting a first touch on the physical keyboard when the physical keyboard is in the first position in which the physical keyboard is exposed for use, wherein a force of the first touch is insufficient to cause depression of any of the mechanical keys to enter any of the characters associated with the mechanical keys, and determining that the first touch is associated with haptic feedback;

provide second haptic feedback to the touch-sensitive display by actuating the actuator at a second intensity that is greater than the first intensity, in response to detecting a second touch on the touch-sensitive display when the physical keyboard is in the second position in which the physical keyboard is not exposed, and determining that the second touch is associated with haptic feedback, such that haptic feedback is provided to the touch-sensitive display disposed in the display housing, which is different than the keyboard housing in which the actuator is disposed; and provide no haptic feedback when a third touch is detected on the touch-sensitive display when the physical keyboard is detected in the first position in which the physical keyboard is exposed for use.

9. The portable electronic device according to claim 8, the first haptic feedback at the first intensity is provided in response to detecting that the physical keyboard is in the first position in which the physical keyboard is exposed for use.

10. The portable electronic device according to claim 9, wherein the second haptic feedback at the second intensity is provided in response to detecting that the physical keyboard is in the second position in which the physical keyboard is not exposed.

11. The portable electronic device according to claim 8, comprising a sensor coupled to the processor to detect a position of the physical keyboard.

12. The portable electronic device according to claim 8, wherein the actuator comprises a single actuator disposed in a housing of the physical keyboard for providing haptic feedback to both the touch-sensitive display and the physical keyboard.

* * * * *